Nov. 23, 1954  S. P. KISH  2,694,863
FEMALE MOLD
Filed Aug. 27, 1949  2 Sheets-Sheet 1
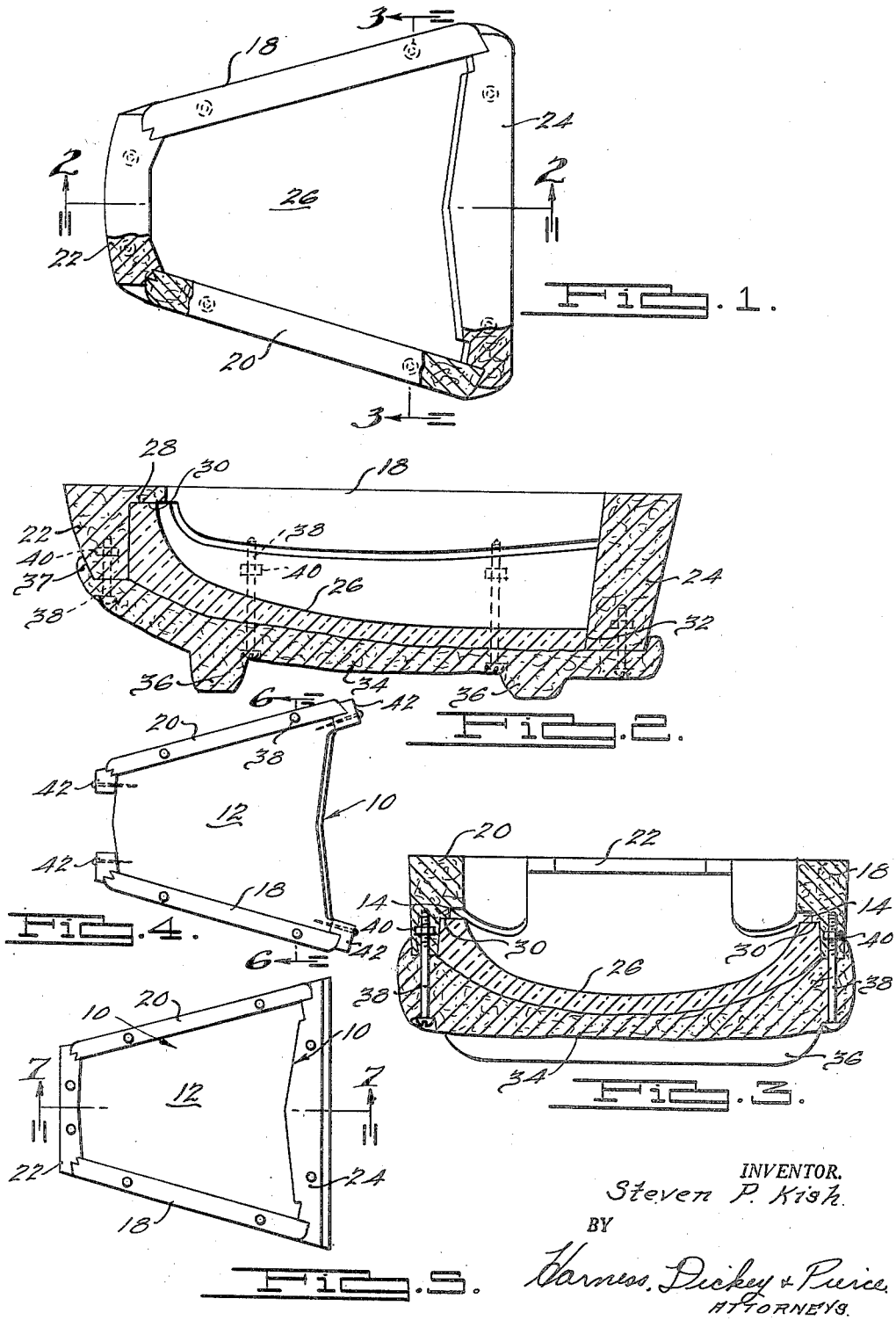
INVENTOR.
Steven P. Kish.
BY
Harness, Dickey & Pierce
ATTORNEYS.

Nov. 23, 1954 S. P. KISH 2,694,863
FEMALE MOLD

Filed Aug. 27, 1949 2 Sheets-Sheet 2

INVENTOR.
Steven P. Kish.
BY
Harness, Dickey & Pierce
ATTORNEYS.

United States Patent Office 2,694,863
Patented Nov. 23, 1954

2,694,863

FEMALE MOLD

Steven P. Kish, Lansing, Mich., assignor to Kish Plastic Products, Inc., Lansing, Mich., a corporation of Michigan Application August 27, 1949, Serial No. 112,676

6 Claims. (Cl. 33—174)

This invention relates broadly to the art of tool-making and refers more particularly to the manufacture of fixtures of the type conventionally used in the fabrication of sheet-metal parts.

In modern industrial practice it is conventional to make a model of wood or the like of a part to be manufactured. Male and female duplications and other fixtures useful in the manufacture of stamping and forming dies and in the fabrication of sheet-metal parts are then made from the model or the duplications. These fixtures reproduce the model in either a positive or negative form and are more permanent than the model. In many instances the model disintegrates or changes its shape relatively quickly, and the fixtures must preserve the form of the model long after the latter has deteriorated. The fixtures are subject to considerable handling and abuse in use; consequently, it is essential that they be strong and rugged in construction and that they maintain their original form under all conditions of use. Moreover, the fixtures must be able to withstand all types of weather without appreciable or significant changes in dimension.

In many instances the fixtures are exceedingly expensive and this factor may have a profound effect on the cost of the final product. Consequently, it is desirable to maintain costs of the fixtures as low as possible. Manifestly, however, it is imperative that this be done without in any way sacrificing any of the features or characteristics hereinabove considered.

An important object of the present invention is to provide a fixture of the above-mentioned character that meets all the qualifications and specifications set forth above.

Another object of the invention is to provide a fixture of the above-mentioned character that is relatively easy and inexpensive to manufacture.

Still another object of the invention is to provide a fixture that is pre-eminently satisfactory under all conditions of use for which it is intended.

Other objects and advantages of the invention will be apparent during the course of the following description.

Figure 6:
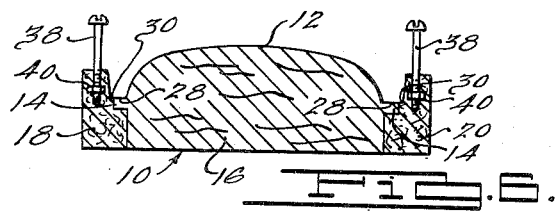
Figure 7:
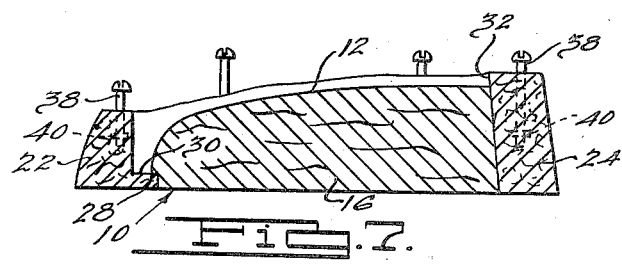
Figure 8:
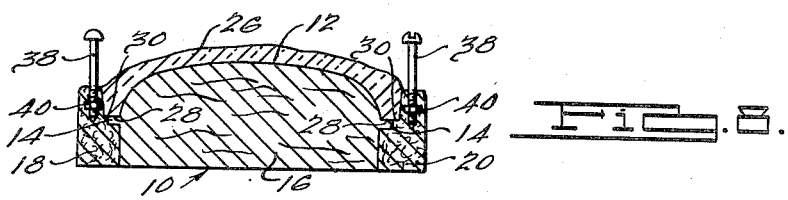
Figures 9, 10:
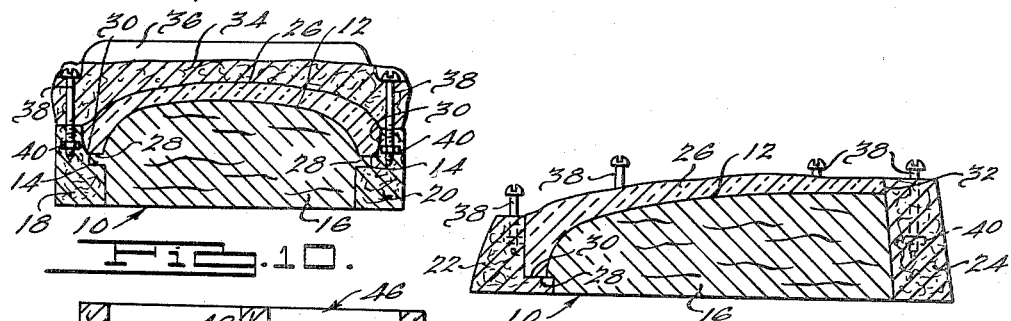
Figure 11:
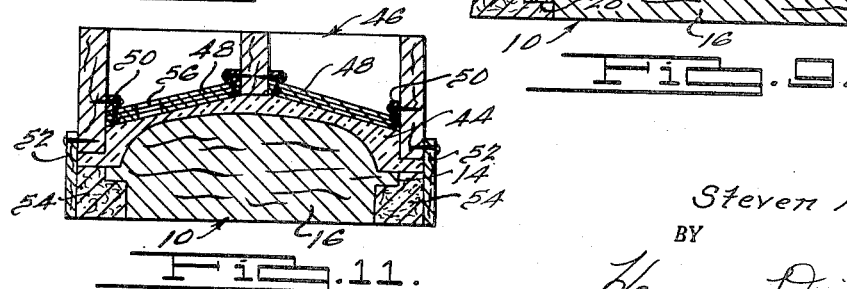

In the drawings forming a part of this specification and wherein like numerals are employed to designate like parts throughout the same, Fig. 1 is a bottom plan view of a female mold fixture embodying the invention, Fig. 2 is a longitudinal sectional view taken on the line 2—2 of Fig. 1, Fig. 3 is a transverse sectional view taken on the line 3—3 of Fig. 1, Fig. 4 is a top plan view showing the first step of forming side rails on the model in the manufacture of a female mold according to the present invention, Fig. 5 is a plan view similar to Fig. 4 but showing all of the rails assembled on the model, Fig. 6 is a transverse sectional view taken on the line 6—6 of Fig. 5, Fig. 7 is a longitudinal sectional view taken on the line 7—7 of Fig. 5, Figs. 8 and 9 are sectional views corresponding to Figs. 6 and 7 respectively but illustrating a subsequent step in the fabrication of the mold, Fig. 10 is a transverse sectional view showing the finished mold assembled on the model from which it is made, and Fig. 11 is a transverse, vertical sectional view showing a modified mold construction embodying the invention.

In the drawings I have shown a model 10 which, for the purpose of illustration, is in the form of an automobile hood. The particular model here shown is of wood and has a top surface 12 which is the surface to be reproduced. At opposite sides of the model are laterally projecting ribs 14 which define the trim development and side flanges of the hood. Below the ribs 14 is a base portion 16 which provides a support for the model and holds the ribs spaced substantially above the supporting surface.

The fixture here shown by way of illustration is a female mold of the model 10. It will be readily apparent, however, that the invention is not confined or restricted to this particular type of fixture. The basic principles here disclosed in connection with the structure and method of fabricating the female mold also are applicable to the manufacture of other types of fixtures. Spotting racks, checking fixtures, and the like are typical examples of such other fixtures. Thus, the invention is not limited to the particular embodiment shown but has broader utility and is readily adaptable to the manufacture or construction of other fixtures and tools well known to the art.

The female mold here shown comprises a pair of rails 18 and 20 at opposite sides and a pair of rails 22 and 24 at opposite ends thereof. The four rails 18, 20, 22 and 24 detachably interlock with each other at the ends thereof and collectively define a frame having the same size and shape as the model 10. A removable plastic liner or shell 26 accurately reproduces the top surface 12 of the model 10 and fits snugly against the frame defined by rails 18, 20, 22 and 24. Also, it will be observed that the plastic shell 26 is formed with a flat marginal surface 28 which seats against and is solidly supported by radial shoulders 30 at the inner sides of rails 18, 20, and 22. The rearward edge 32 of shell 26 merely abuts the inner side of rail 24, as perhaps best shown in Fig. 2. On and suitably bonded to the plastic shell 26 is an outer shell 34 of plaster or the like which conveniently can be formed with suitable reinforcing ridges 36. Two such reinforcing ridges 36 are here shown. It will be observed that the outer shell 34 extends marginally beyond the shell 26 so that it overlaps the rails 18, 20, 22 and 24 as at 37. By reason of this construction the marginal portions of the inner and outer shells co-operate to define a pocket or annular groove which receives the upper portion of the frame. The interfitting relation between the parts serves to hold the parts solidly together and properly positioned with respect to each other. Also, making the parts so that the composite plastic-plaster shell "pockets" the frame facilitates assembly of the mold parts and assures a stronger assembled unit.

In practice, the shell 34 is removable from the frame but is detachably fastened thereto by bolts 38 and nuts 40. The nuts 40 are embedded in rails 18, 20, 22 and 24, and screws 38 extend through the overlapping marginal portions of the outer shell 34 and into the rails for engagement with the nuts. Each rail is here shown provided with two nuts 40. However, it will be readily apparent that the particular number of fastening means will vary in any particular situation, depending upon the size and shape of the fixture, upon the particular manner in which it is constructed and upon the size and weight of the individual parts.

When forming the mold, the model 10 is first placed on a suitable table or other support so that it rests upon the base 16. The two side rails 18 and 20 are first formed, and after these rails have been properly fitted to the model the end rails 22 and 24 are made. I prefer to make all four rails 18, 20, 22 and 24 from plaster but it will be readily apparent that a variety of materials can be used for this purpose. Plaster offers an easy and convenient way of making the rails 18, 20, 22 and 24 as it is readily available, relatively inexpensive, can be worked readily in the plastic state and quickly sets or hardens to final form. When plaster is used, the model 10 is first coated with parting compound, plaster is then paddled to a suitable depth against the sides of the model and, in the particular form of the invention shown in the drawings, to a substantial height above the ribs 14. The plaster is then permitted to harden. If plaster of proper consistency is used, it is not necessary to employ retaining forms in order to prevent the plaster from slumping before it is finally cured or hardened. However, I prefer to employ blocks 42 which are temporarily tacked or otherwise fastened on the ends of the model 10 to shape the ends of the side rails 18 and 20. After the rails 18 and 20 have hardened, blocks 42 are removed and the end rails 22 and 24 are cast against the ends of the model and the projecting terminal portions of the side rails 18 and 20. If necessary or desirable, the terminal portions of the side rails 18 and 20 may be coated with parting compound after blocks 42 have been removed to prevent the end rails from adhering thereto.

It will be observed in this connection that the forward ends of side rails 18 and 20 are notched so as to provide an interlocking connection with the front rail 22 and that the rearward ends thereof are tapered or beveled slightly toward the outer sides thereof to provide an interlocking connection with the rear rail 24. The front and rear rails 22 and 24 conveniently may be formed on the model in the same manner as side rails 18 and 20; and, as the front and rear rails are formed, they interlock or interfit with the side rails 18 and 20 as shown in the drawing. However, after rails 22 and 24 have hardened or set they may be readily removed or disassembled from the model and from the side rails 18 and 20.

There are plasters available on the market that can be drilled and tapped to receive the screws 38. However, in order to assure relatively permanent fastenings, I prefer to embed nuts 40 in the rails as shown in the drawings. When this is done, the lower ends of screws 38 having the nuts 40 threaded thereon are embedded in the top surface of the rails when the plaster is in a formable state. If desired the embedded portions of the screws 38 may be coated with a suitable parting compound so that any bond which is established between the plaster and the screws during hardening of the plaster is easily broken thereby permitting ready removal or adjustment of the screws. It will be readily apparent that fastening screws 38 and nuts 40 are embedded identically in all of the rails 18, 20, 22 and 24 and that in every instance the screws extend substantial distances above the rails.

The horizontal seats 30 preferably are formed at the time the rails 18, 20, 22 and 24 are made, but it will be readily apparent that they can be cut into the rails after the plaster has set. In every instance, however, the shoulders or seats 30 preferably extend flush with the trim lines of the model. In the model here shown by way of illustration, the seats 30 on side rails 18 and 20 extend flush with the top surfaces of rib 14 and the seat 30 on the front rail 22 extends flush with the juncture of base portion 16 and the front trim line of the model (Fig. 6).

After the side rails have been formed in the manner described above, they are assembled on the model 10, and the inner surfaces of the rails as well as the exposed top surface of the model are coated with parting compound. The inner shell 26 of organic plastic material is then formed on the top surface of the model and within the confines of the rails 18, 20, 22 and 24. Any thermosetting organic plastic may be used for this purpose, and urea and phenol base resins have been found to be preeminently satsifactory. These resins can be prepared in a plastic state and applied to the model in an essentially fluid condition. After the resin has been paddled to a suitable depth on the model it is cured by baking in an oven or by any other suitable means. Manifestly, the plastic shell 26 accurately reproduces the top surface of the model 10 and co-operates with the rails 18, 20, 22 and 24 to provide a complete female mold of the model.

After the plastic inner shell 26 has hardened, the relatively thick outer shell 34 of plaster or the like is applied thereto. The plaster 34 immediately bonds to the essentially rough outer surface of the shell 26 so that the two shells form a composite cover for the mold. Also, it will be observed that the plaster 34 is paddled over the top surface of the rails 18, 20, 22 and 24 and it conveniently may extend slightly over the outer edges of the rails as perhaps best shown in Figs. 2, 3 and 9. Manifestly, the plaster encloses the projecting portions of screws 38 and the plaster desirably should be built up at least to the heads of the screws. In order to eliminate or at least reduce the shrinkage inherent in most plasters, a suitable filler such as asbestos or the like may be incorporated in the plaster when the latter is mixed.

By reason of the above the two shells 26 and 34 are firmly fastened or bonded together and are readily removable from the rails 18, 20, 22 and 24. Screws 38 are readily operable to permit disassembly of the composite plastic-plaster cover from the rails or to fasten the cover to the rails.

In Fig. 11 I show a composite, plastic-faced, female mold of modified construction, and for purpose of illustration I have shown the mold associated with a model 10 which is identical to the model described in connection with the first form of the invention.

More specifically the mold comprises a plastic facing 44 which is carried by a suitable backing 46 of wood, Masonite or the like. The backing 46 may be constructed in any suitable manner; however, it preferably is in the form of a lattice or "egg crate," and this construction is shown in the drawings. The specific lattice shown is light in weight, simple to construct, and strong and durable in use. In practice the lattice 46 conforms generally to the outline of the model 10 and the openings or holes defined by the lattice bars are closed by filler pieces 48 of Masonite, plywood or the like which are nailed or otherwise fastened to blocks 50 on the bars. Supporting strips 52 nailed or otherwise fastened to and depending from the lattice 46 support the latter suitably spaced above the model 10. Rails 54 of plaster or the like are provided around the base portion of the model as in the form of the invention first described. In this form of the invention, however, the rails 54 are made to extend flush with the top surfaces of the ribs 14.

In making the mold, the side rails 54 are first cast against the model, and this may be done conveniently in the same manner as in the form of the invention first described. The lattice 46 is then constructed and supported above the model as shown in the drawings by means of the strips 52. In this connection it will be observed that strips 52 frame the rails 54 and close the spaces between the lattice and the rails. Organic plastic material is then poured into the space between the lattice 46 and the model through one or more pouring openings 56 in filler pieces 48.

Thus, the plastic material 44 is cast against the surface of the model 10 so that it conforms to and accurately reproduces in a negative form the surface of the model. Also, the plastic, by its inherent nature, bonds securely to the lattice 46. If necessary or desirable, suitable conventional anchoring means may be provided in the undersurface of the lattice 46 to supplement the natural bond which is established between the plastic and the lattice; however, I have found that in most instances such anchoring means are not necessary.

If it is necessary or desirable in use to incorporate the rails 54 as a part of the fixture, they may be detachably fastened thereto in any suitable manner, as, for example, by the means shown in connection with the form of the invention first described. On the other hand, if the contemplated use of the fixture does not require the rails 54, they may be discarded after the plastic 44 is hardened.

Molds of the type last described can be made very quickly and easily and they are relatively inexpensive. Moreover, such fixtures are adequately strong in use and they assure exact negative reproduction of the model.

It may thus be seen that I have accomplished the objects of my invention. All the operations required to make the fixture can be accomplished easily and quickly and with materials which are readily available and relatively inexpensive. By making the cover of the mold a composite of plastic and plaster, substantially all the disadvantages inherent in these two compositions are eliminated without sacrifice to the advantages thereof. For example, the inner plastic liner or shell 26 of the cover reproduces the surface of the model exactly and provides a relatively hard surface which makes the fixture suitable for use in capacities where it would be entirely unsuited if the cover were made of plaster alone. Further, by using a plastic inner liner or shell, the excessive expansion and contraction characteristics which make it difficult to obtain an accurate impression by means of plaster alone is eliminated. Further, the composite plastic and plaster construction provides a mold that is much stronger, particularly at the corners, than any mold made from either of these materials alone.

Having thus described the invention, I claim:

1. A surface-reproduction fixture comprising a plurality of rails, collectively defining a frame having a central opening and detachably interlocking with each other at the ends thereof, said frame having a radial shoulder in one face thereof around said center opening; nuts embedded in the rails outwardly of said radial shoulder; a removable plastic shell fitting snugly in said frame and formed with a flat marginal surface seating against and solidly supported by said shoulder, the entire undersurface of said shell within said marginal surface being finished and conforming precisely to the surface reproduced thereby; an outer plaster shell on and bonded to said inner shell, said plaster shell peripherally overlapping said rails; and screws extending through said outer shell and threaded into said nuts detachably fastening the shell to the rails.

2. A surface-reproduction fixture comprising a plurality of rails detachably interlocked with each other at the ends thereof, and a shell detachably fastened to said rails, said shell having coextensive inner and outer layers intimately bonded at all points, the inner layer thereof being of plastic material, said plastic layer and said rails having inner surfaces mutually co-operating to reproduce a surface of predetermined form.

3. A surface-reproduction fixture comprising a plurality of rails collectively defining a frame having a center opening, said frame having a radial shoulder in one face thereof around said center opening, means detachably interconnecting the ends of the rails holding the same assembled in the frame, and a shell detachably fastened to said rails having coextensive inner and outer layers intimately bonded at all points, the inner layer thereof being of plastic material, said inner plastic layer being formed with a flat marginal surface seating against and solidly supported by the radial shoulder of said frame, the inner surfaces of said plastic layer and of said rails accurately reproducing a surface of predetermined form.

4. A surface-reproduction fixture comprising a shell, having coextensive inner and outer layers intimately bonded at all points, the inner layer thereof being of plastic material, and a plurality of rails extending around the periphery of said shell detachably interlocked with each other at the ends thereof and with said shell, the inner surfaces of said plastic layer and said rails mutually co-operating to reproduce a surface of predetermined form.

5. A surface-reproduction fixture comprising a plurality fo rails collectively defining a frame having a center opening, said frame having a radial shoulder in one face thereof around said center opening, means detachably interconnecting the ends of the rails holding the same assembled in the frame, and a shell having coextensive inner and outer layers intimately bonded at all points, the inner layer thereof being of plastic material, said plastic layer formed with a flat marginal surface seating against and solidly supported by the radial shoulder of said frame, the inner surfaces of said plastic layer and of said rails accurately reproducing a surface of predetermined form.

6. A surface reproduction fixture comprising a plurality of rails collectively defining a frame having a center opening, said frame having a radial shoulder in one face thereof around said center opening, means detachably interconnecting the ends of the rails holding the same assembled in the frame, a shell of plastic material seating peripherally against and detachably fastened to said rails, said shell formed with a flat marginal surface seating against and solidly supported by the radial shoulder of said frame, the inner surfaces of said plastic layer and of said rails accurately reproducing a surface of predetermined form, and strengthening and reinforcing means superposed on and bonded to said plastic layer.

References Cited in the file of this patent

UNITED STATES PATENTS

| Number | Name | Date |
| --- | --- | --- |
| 805,477 | Lorant | Nov. 28, 1905 |
| 820,603 | Roth | May 15, 1906 |
| 996,783 | Moreau | July 4, 1911 |
| 1,183,319 | Pemberton | May 19, 1916 |
| 1,336,388 | Youngberg | Apr. 6, 1920 |
| 1,634,106 | Hopkinson | June 28, 1927 |
| 1,707,492 | Pettis | Apr. 2, 1929 |
| 2,371,047 | Groehn | Mar. 6, 1945 |
| 2,420,359 | Dasher | May 13, 1947 |
| 2,434,372 | Stewart | Jan. 13, 1948 |
| 2,460,242 | Renaud | Jan. 25, 1949 |